United States Patent [19]

Ishikawa

[11] Patent Number: 4,775,893

[45] Date of Patent: Oct. 4, 1988

[54] FACSIMILE TRANSMISSION SYSTEM

[75] Inventor: Yuji Ishikawa, Kawasaki, Japan

[73] Assignee: Canon Kabushiki Kaisha, Tokyo, Japan

[21] Appl. No.: 672,783

[22] Filed: Nov. 19, 1984

[30] Foreign Application Priority Data

Nov. 22, 1983 [JP] Japan .................................. 58-218684

[51] Int. Cl.⁴ .............................................. H04N 1/40
[52] U.S. Cl. .................................. 358/261.1; 358/257; 358/288
[58] Field of Search ................. 358/287, 260, 261, 288

[56] References Cited

U.S. PATENT DOCUMENTS 4,586,088 4/1986 Kondo ................................... 358/260
4,719,514 1/1988 Kurahayashi ....................... 358/257

FOREIGN PATENT DOCUMENTS 57-162572 10/1982 Japan .

Primary Examiner—Edward L. Coles, Sr.
Attorney, Agent, or Firm—Fitzpatrick, Cella, Harper & Scinto

[57] ABSTRACT

A facsimile transmission system which comprises steps of recognizing, at a signal transmission side, a minimum transmission time at a signal receiving side and a capacity of a buffer memory for temporarily storing there in received data; transmitting image data in a plurality of lines of the image original which can be stored in the buffer memory and comparing the total sum of the minimum transmission time in the plurality of lines with a time required for the transmission, and transmitting a full bit, only when the time required for the signal transmission is short.

13 Claims, 10 Drawing Sheets

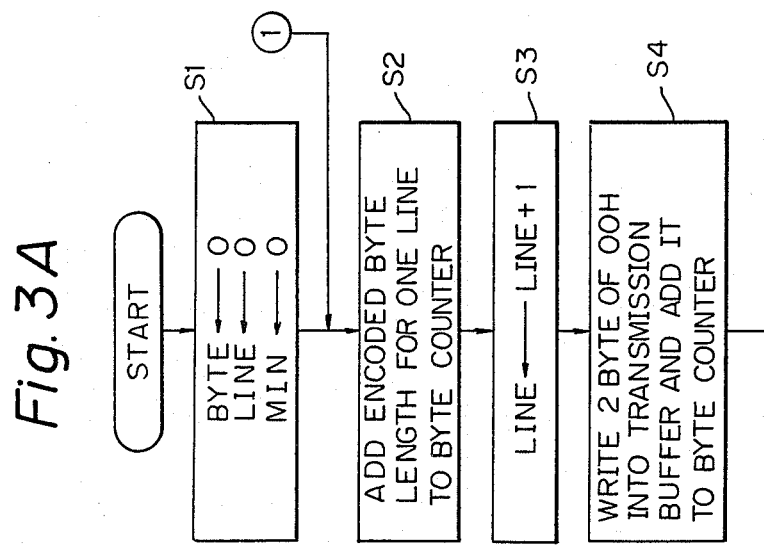

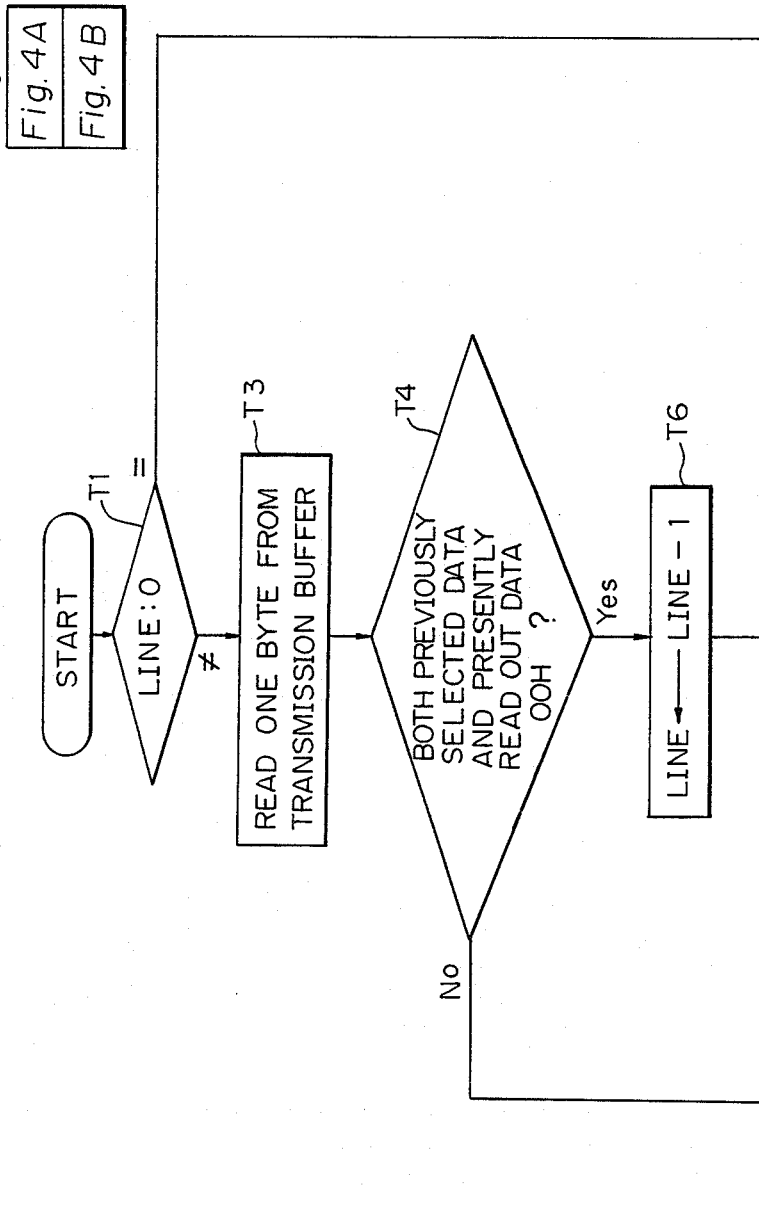

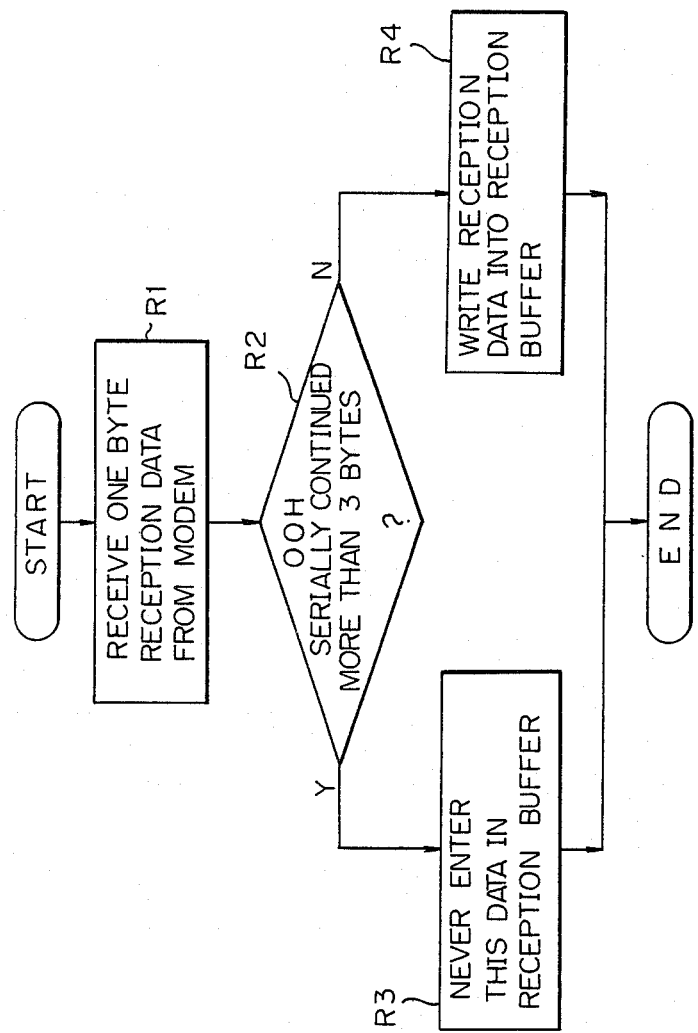

FACSIMILE TRANSMISSION SYSTEM

BACKGROUND OF THE INVENTION

1. Field of the Invention

This invention relates to a facsimile transmission system, and more particularly, it is concerned with a facsimile transmission system for transmitting image signals by encoding them for suppressing prolixity.

2. Description of Prior Arts

According to the recommendation of CCITT, there is a condition such that, when image signals are transmitted by subjecting them to MH (Modified Haffman) encoding, "the transmission time for each line must be longer than the minimum transmission time determined in the control procedures". Therefore, when a time required for transmitting encoded bits for one line is shorter than the minimum transmission time, it has been a practice to insert a bit having this fill bit. As the result of inserting this fill bit, there has been such a disadvantage that the signal transmission time becomes longer.

SUMMARY OF THE INVENTION

The present invention has been made with a view to removing such disadvantage inherent in the known facsimile transmission system, and aims at providing a facsimile transmission system which has successfully reduced the quantity of the fill bit to be inserted at the time of transmitting lines of image signals having a short encoded bit length, without giving mal-effect to the resulting image.

It is another object of the present invention to provide a facsimile transmission system which is able to substantially shorten the transmission time without increasing the recording speed of a signal receiver.

The foregoing objects, other objects as well as the specific construction and function of the facsimile transmission system according to the present invention will become more apparent and understandable from the following detailed description thereof, when read in conjunction with the accompanying drawing.

BRIEF DESCRIPTION OF THE DRAWING

FIGS. 4A-B are flow charts for explaining an interruption processing operation by modem;

FIG. 9 is a control flow chart at the signal receiving side.

DETAILED DESCRIPTION OF PREFERRED EMBODIMENTS

In the following, the present invention will be described in detail with reference to preferred embodiments thereof.

Figure 1:
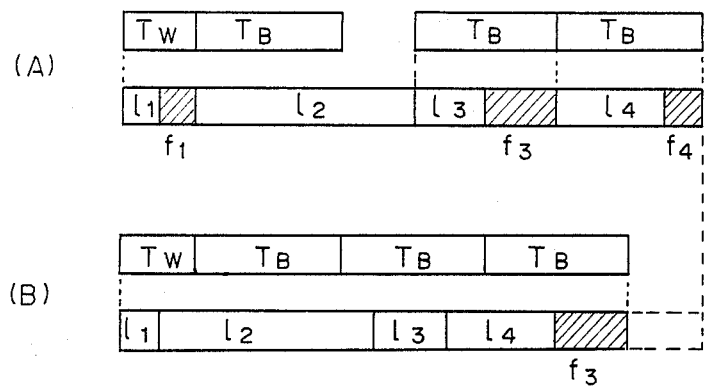
FIGS. 1A and 1B are explanatory diagrams illustrating, in comparison, the signal transmission time in the conventional system and the inventive system, respectively.

FIGS. 1A and 1B are explanatory diagrams for comparing the facsimile transmission system according to the present invention and the conventional system, the former indicating the conventional system and the latter indicating the system according to the present invention. In the explanatory diagrams of FIGS. 1A and 1B, distinction is made in the minimum transmission time in the signal receiver between a case where one whole line is white, and a case where a line contains therein black picture element. In other words, when an entire line is white, "a white skipping" is performed to shorten the transmission time. It should be noted here that the minimum transmission line is equal to a time required for the signal receiver to record one line.

In the drawing, $T_W$ designates the minimum transmission time for the whole white line, and $T_B$ indicates the minimum transmission time for the line containing therein black picture element. Further, $l_1$ denotes a code transmission time for the whole white line, and $l_2$ to $l_4$ are code transmission time for those lines containing therein black picture element (where: $l_1 < T_W$; $l_2 > T_B$; $l_3$; $l_4 < T_B$).

As will be apparent from comparison of both FIGS. 1A and 1B, since relationship between $l_1$ and $T_W$, and $l_3$, $l_4$ and $T_B$ in the conventional transmission system is: $l_1 < T_W$; $l_3$, $l_4 < T_B$, the fill bits $f_1$, $f_3$, and $f_4$ are inserted as indicated by diagonal lines, with the consequence that signal transmission time as a whole becomes longer.

In contrast to this, the transmission system according to the present invention performs the signal transmission in the following manner. That is to say, on condition that a buffer memory capacity of the signal receiver has already been made known in the protocol of CCITT recommendation T30, if and when the maximum encoded lines to enter fully into the buffer memory of this signal receiver are four lines of $l_1$ to $l_4$, the signal transmitter sends out $l_1$ to $l_4$ without insertion of any fill bit whatsoever.

Here, as shown in FIG. 1B, of the lines as now transmitted, since the full white line is $l_1$ and the lines containing therein black picture element are $l_2$ to $l_4$, the following calculation is made, and, if $f_0 > 0$, a fill bit corresponding to time $f_0$ is inserted:

$$f_0 = (T_W \times 1 + T_B \times 3) - (l_1 + l_2 l_3 + l_4).$$

On the other hand, when $f_0 \leq 0$, no insertion of the fill bit is carried out. As the result of this, the transmission time will be shortened for a portion as indicated by a dot line in FIG. 1B.

Figure 2:
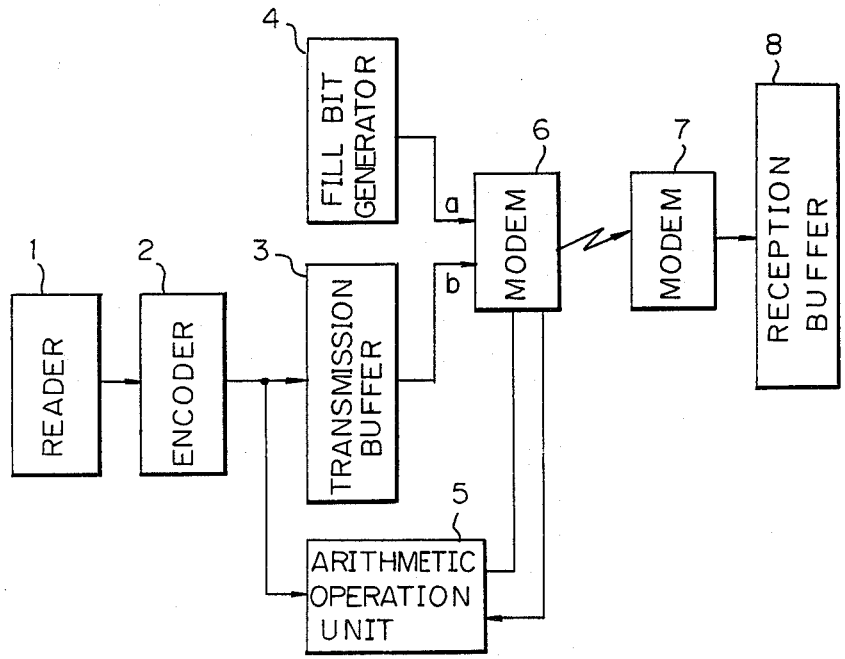
FIG. 2 is a block diagram showing a control circuit according to the present invention.

Incidentally, FIG. 2 illustrates a block diagram of a control circuit for performing the signal transmission in accordance with the abovementioned system.

In FIG. 2, a reference numeral 1 designates a reader where data are read, and the data as read are encoded in an encoder 2 and then stored in a buffer memory 3 at the signal transmission side. A reference numeral 4 designates a fill bit generator, wherein designated fill bits are produced by the control operations in an arithmetic operation unit 5. The arithmetic operation unit 5 is provided with a counter for counting a length of code produced by the encoder 2, and a counter for integrating a bit length comforming to the minimum transmission time required by each line.

Further, a reference numeral 6 designates a modem of the signal transmitter, a numeral 7 refers to a modem of the signal receiver, and 8 denotes a buffer memory having a capacity of receiving therein codes for a plurality of lines.

It is understood that capacity of the buffer memory of this signal receiver has already been known in the protocol prior to commencement of the image transmission.

By the construction as mentioned above, the data read in the reader 1 are encoded in the encoder 2 for suppressing the prolixity by the MH system, etc., and then stored in the buffer memory at the signal transmission side.

At the same time, the arithmetic operation unit 5 integrates the bit number which meets the code length and the minimum transmission time.

At the instant when the integrated value of this code length exceeds the capacity of the buffer memory 8 of the signal receiver, the following operation is conducted for the lines which have been completely encoded before that time:

$$\text{(sum of bit number meeting the minimum transmission time)} - \text{(sum of code length)} \quad (1).$$

the result of the operation by the equation (1) is negative (−), no insertion of the fill bit is performed but transmission of the code is continued. On the other hand, if the result of the operation is positive (+), instruction is given by the modem 6 at the signal transmission side to the fill bit generator to generate the fill bit number obtained in accordance with the equation (1) above after termination of transmission of the last line, and, at the same time, control is effected to transmit the fill bit generated in the modem 6.

Figure 3B:
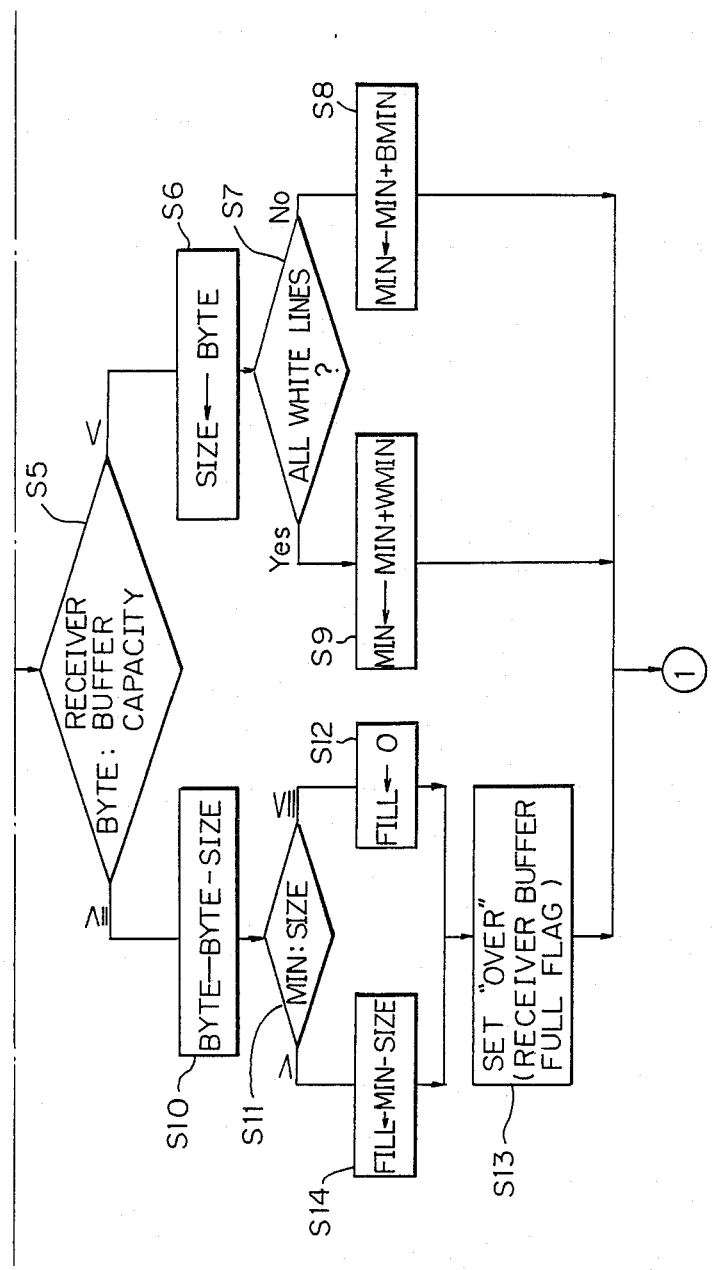
FIGS. 3 A-B are charts for explaining ordinary control operation.

In the following, detailed explanations will be given as to the process steps to be done in the arithmetic operation unit 5 in accordance with the flow chart shown in FIG. 3.

To begin with, at step $S_1$, a counter BYTE for counting the total byte number of the codes generated by the encoder 2, a counter LINE for counting the line number which has been encoded, stored in the buffer memory at the signal transmission side, but has not yet been transmitted, and a counter MIN for counting the sum total of the minimum transmission time of the encoded lines are rendered zero, respectively.

Subsequently, at step $S_2$, an encoded byte length in one line is added to the counter BYTE. Then, at step $S_3$, the byte number for one line is added to the counter LINE, after which the operational sequence proceeds to step $S_4$ where 2-byte of $00_H$ is written in the buffer memory 3 at the signal transmission side, after which 2 is added to the counter BYTE.

It should be noted that, in the embodiment of the present invention EOL (end of line) signal is represented by $00_H2$ byte, not by using the code provided by CCITT, which signal is converted to an ordinary EOL by rewriting this final zero to 1 in the interruption processing from the modem 6.

In the next place, the operational sequence proceeds to step $S_5$ where determination is made as to whether the count number in the counter BYTE is greater than the capacity of the buffer memory at the signal receiving side, or not. If the count number is smaller than the buffer memory capacity, the operational sequence proceeds to step $S_6$ where the content of the counter BYTE is transferred to a counter SIZE, and then the operational sequence proceeds to $S_7$.

At the step $S_7$, determination is made as to whether the line is entirely white, or not. If the line is not entirely white, the operational sequence proceeds to step $S_8$ where byte number BMIN corresponding to the minimum transmission time of lines other than the entirely white line is added to the counter MIN. If the line is entirely white, the operational sequence proceeds to step $S_9$ where byte number WMIN corresponding to the minimum transmission time of the entirely white line is added to the counter MIN.

On the other hand, if it is determined in the step $S_5$ that the content of the counter BYTE is larger than the buffer memory capacity, the operational sequence proceeds to step $S_{10}$ where the content of the counter SIZE is subtracted from the content of the counter BYTE. Subsequently, at step $S_{11}$, the content of the counter MIN is compared with the content of the counter SIZE. If the content of the counter SIZE is smaller than the content of the counter MIN, the operational sequence proceeds to step $S_{12}$ to render a byte counter FILL for the fill bit to be zero, after which it goes to step $S_{13}$ to set a full flag OVER which shows that the buffer for the signal receiver has become full.

At the step $S_{11}$, if the content of the counter MIN is larger than the content of the counter SIZE, the operational sequence proceeds to step $S_{14}$ where the content of the byte counter FILL for the fill bit is set to be MIN-SIZE, after which it goes to step $S_{13}$.

Figure 4B:
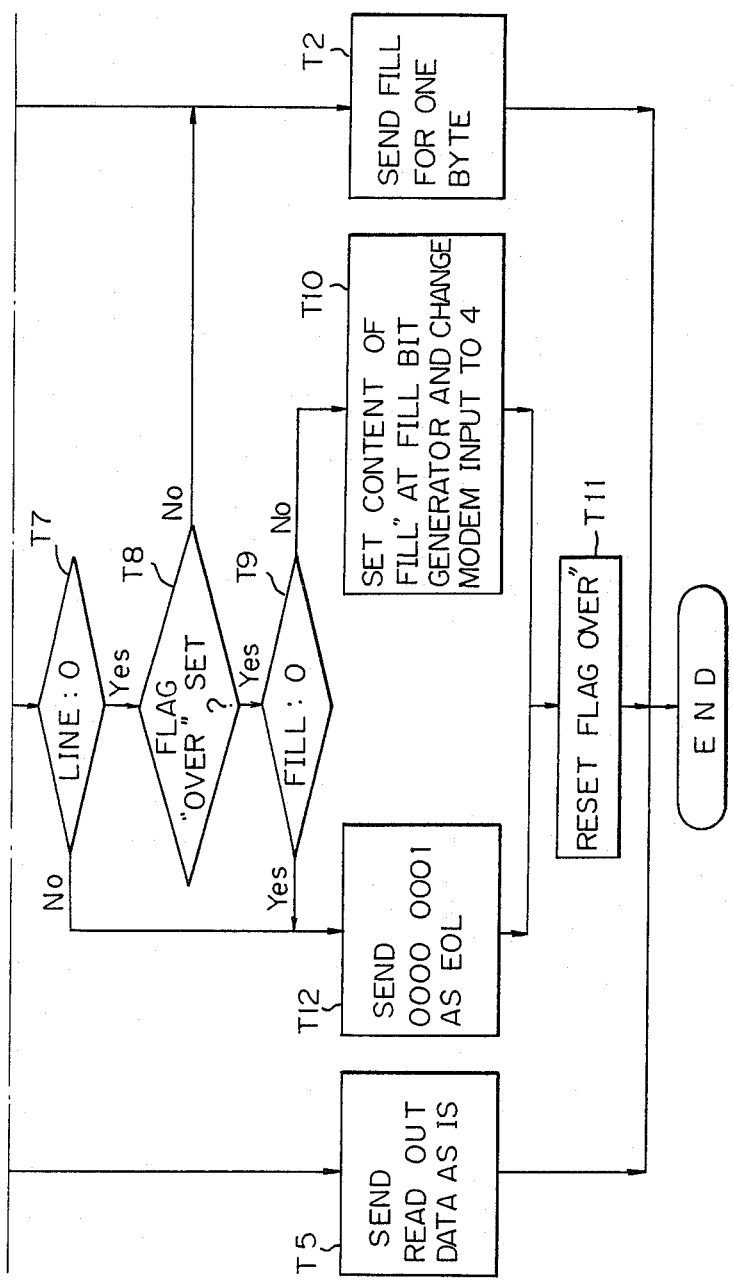

FIG. 4 shows an interruption processing routine from the modem 6. An interruption signal is generated from a timer circuit (not shown), by which the interruption processing is carried out periodically. In more detail, at step $T_1$, determination is made as to whether the line is zero, or not. If the line zero, the operational sequence proceeds to step $T_2$ where one byte is sent out of the byte counter FILL to complete the processing. If, at the step $T_1$, the line is not zero, one byte is read out of the transmssion buffer 3 at step $T_3$, and then the operational sequence proceeds to step $T_4$.

At the step $T_4$, determination is made as to whether the previously sent out data and the currently read out data are both $00_H$, or not. If not $00_H$, the operational sequence proceeds to step $T_5$ where the data as read are sent out as then are, and the proceesing is terminated. If, at the step $T_4$, both data are determined to be $00_H$, the content of the counter MIN is reduced by one at step $T_6$. Then, at step $T_7$, determination is made as to whether the counter LINE is zero, or not. If the line is zero, determination is made, at step $T_8$, as to whether the full flag OVER has been set in the signal receiver buffer, or not. If not set, the operational sequence proceeds to the step $T_2$ to terminate the processing. If the full flag OVER has been set, the operational sequence proceeds to step $T_9$ where determination is made as to whether the byte counter FILL for the fill bit is zero, or not. If not zero, the content of the counter FILL is set in the fill bit generator 4 at step $T_{10}$ to switch an input of the modem 6 over to the side of the fill bit generator 4, after which the operational sequence proceeds to step $T_{11}$ where the full flag OVER is reset to terminate the processing.

On the other hand, at the step $T_7$, if it is determined that the content of the counter LINE is not zero, the operational sequence proceeds to step $T_{12}$ where a code "0000 0001" is sent out as EOL (end of line), after which the operational sequence proceeds to the step $T_{11}$. Also, if, at the step $T_9$, the counter FILL is determined to be zero, the operational sequence proceeds to the step $T_{12}$.

Figure 5:
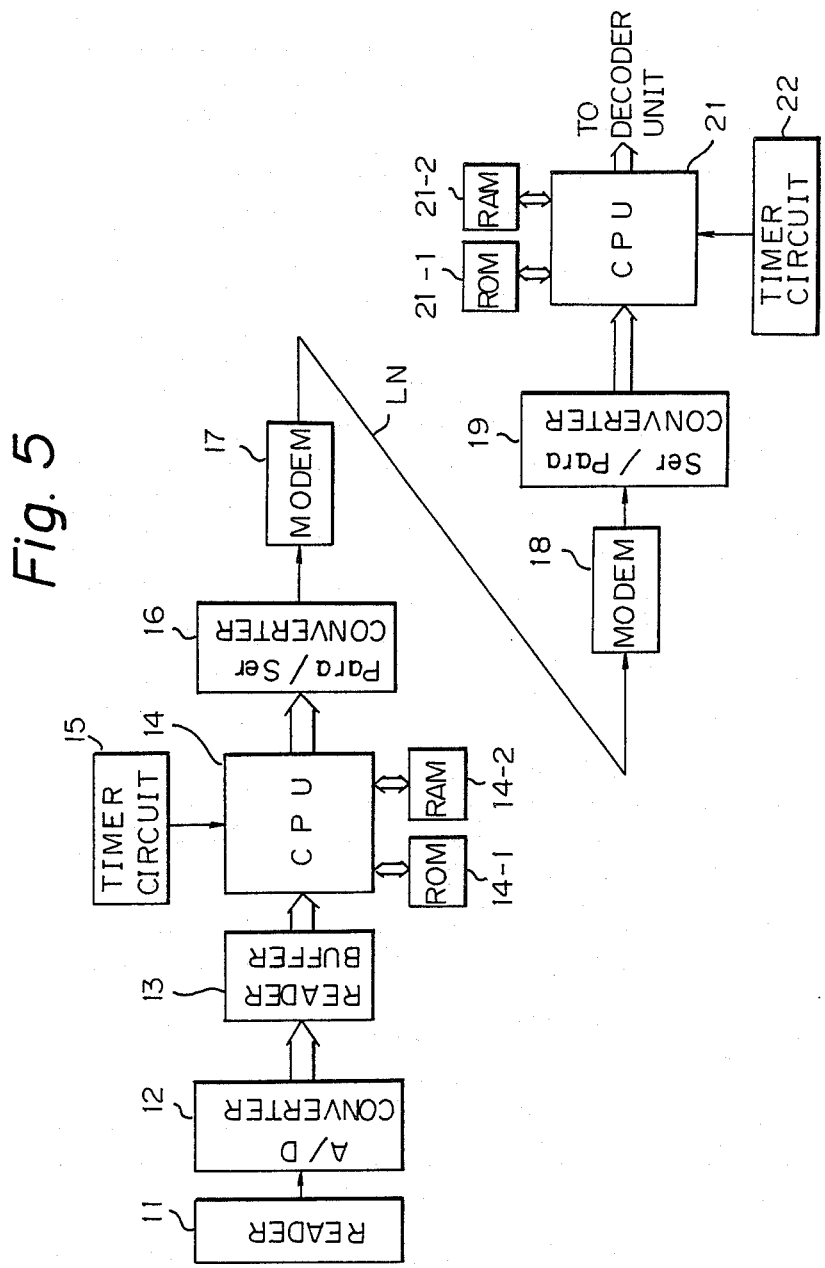
FIG. 5 is a control block diagram of the transmission system according to the second embodiment of the present invention.

FIG. 5 shows another control circuit according to the present invention, wherein a reference numeral 11 designates a reader utilizing a CCD line sensor, etc. Analog image signals obtained from the reader 11 are converted into digital image signals by an analog/digital converter 12. The digital signals are temporarily stored in a reader buffer 13. A CPU 14 functions to turn the image signals stored in the reader buffer 13 into MG codes, and to store the encoded signals in a signal transmission buffer area within a RAM 14-2 on a temporary basis. Then, by the interruption signal generated from a timer circuit 15, the encoded image data within the RAM 14-2 are output to a modem 17 through a parallel/serial converter 16. The above-mentioned processing by the CPU 14 is executed in accordance with a program stored in ROM 14-1. The modem 17 functions to modulate the encoded image data, and to transmit them to a modem 18 at the receiver side through a telephone line LN. The encoded data which have been demodulated at the modem 18 are converted into parallel data by a serial/parallel converter 19. A CPU 21 takes thereinto the encoded data from the serial/parallel converter 19 by the interruption signal from the timer circuit 22 and temporarily store them in a signal receiving buffer region within a RAM 21-2, after which it converts these data into live data to be output to a recording section (not shown). Needless to say, the ROM 21-1 is also provided in CPU 21.

Figure 6:
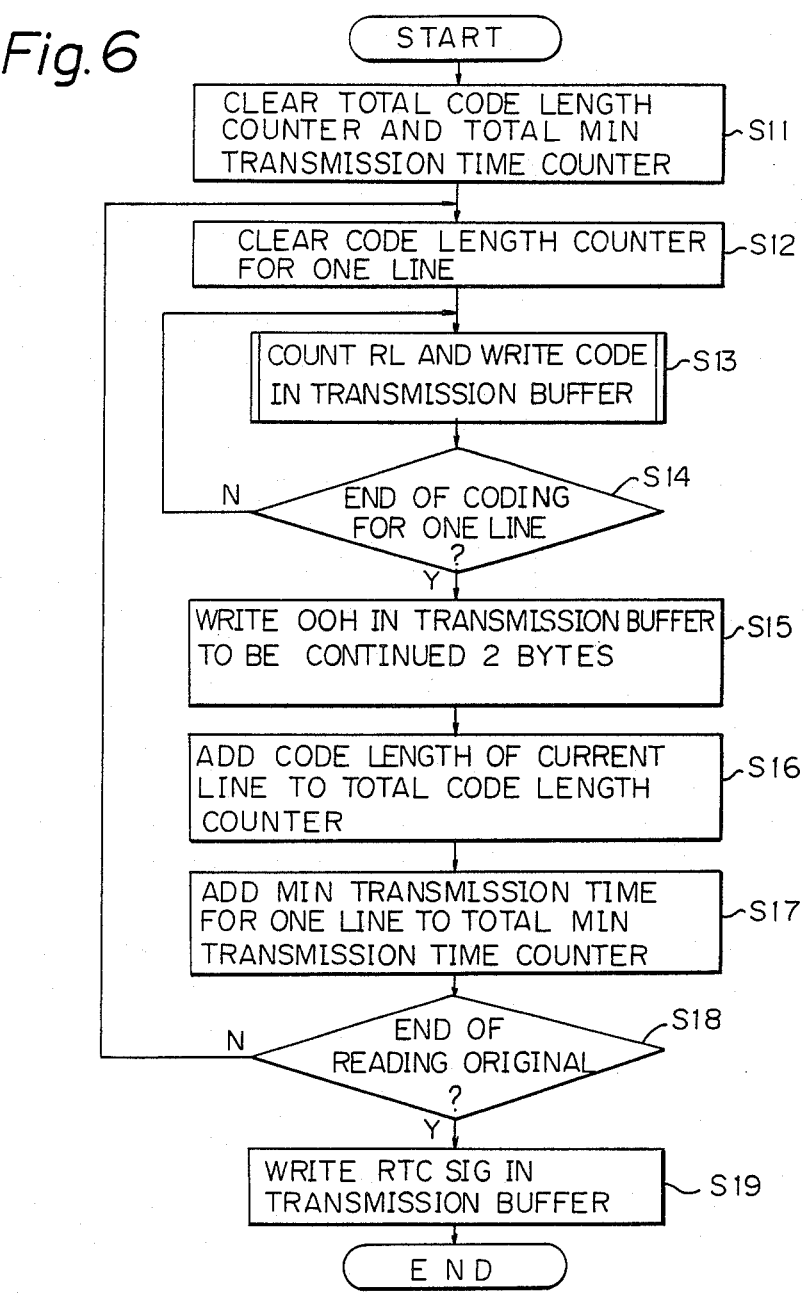
FIGS. 6 to 8 are control flow charts at the signal transmission side.
Figure 7:
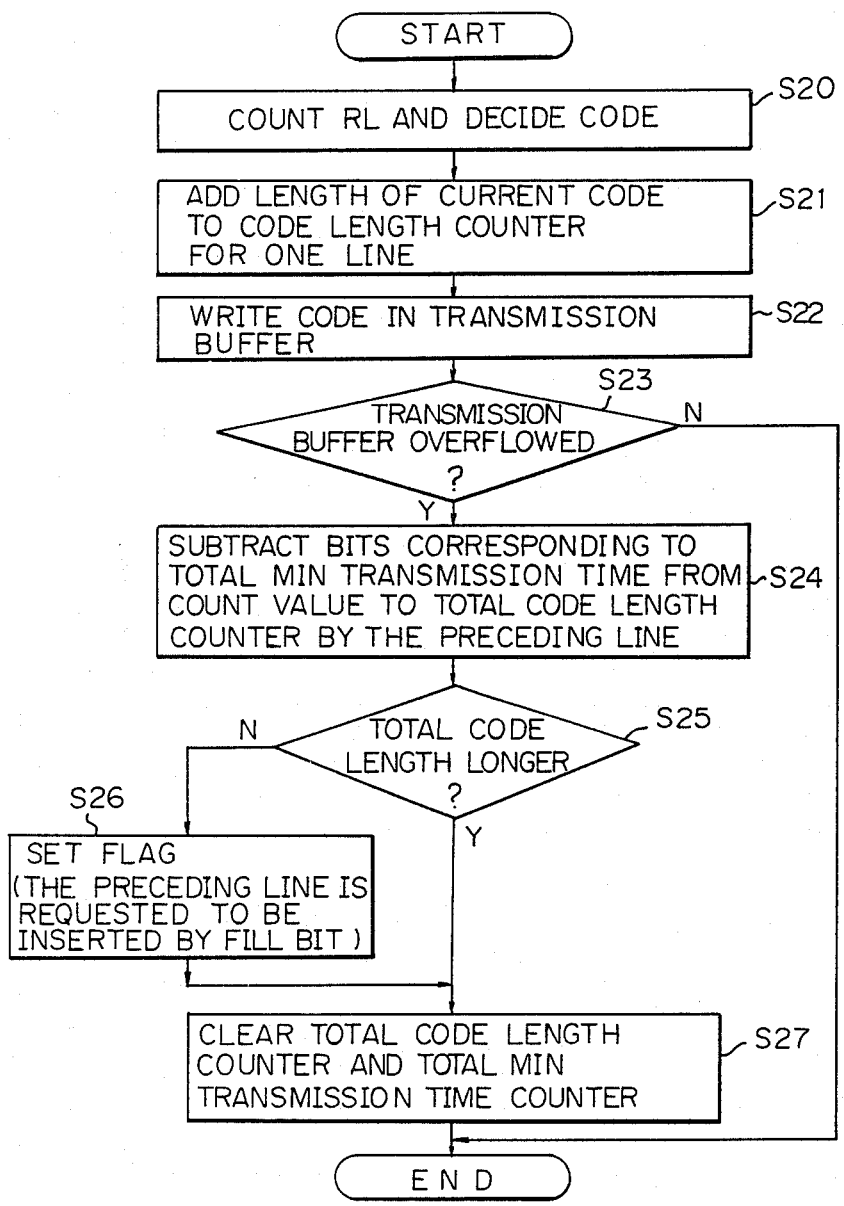
Figure 8:
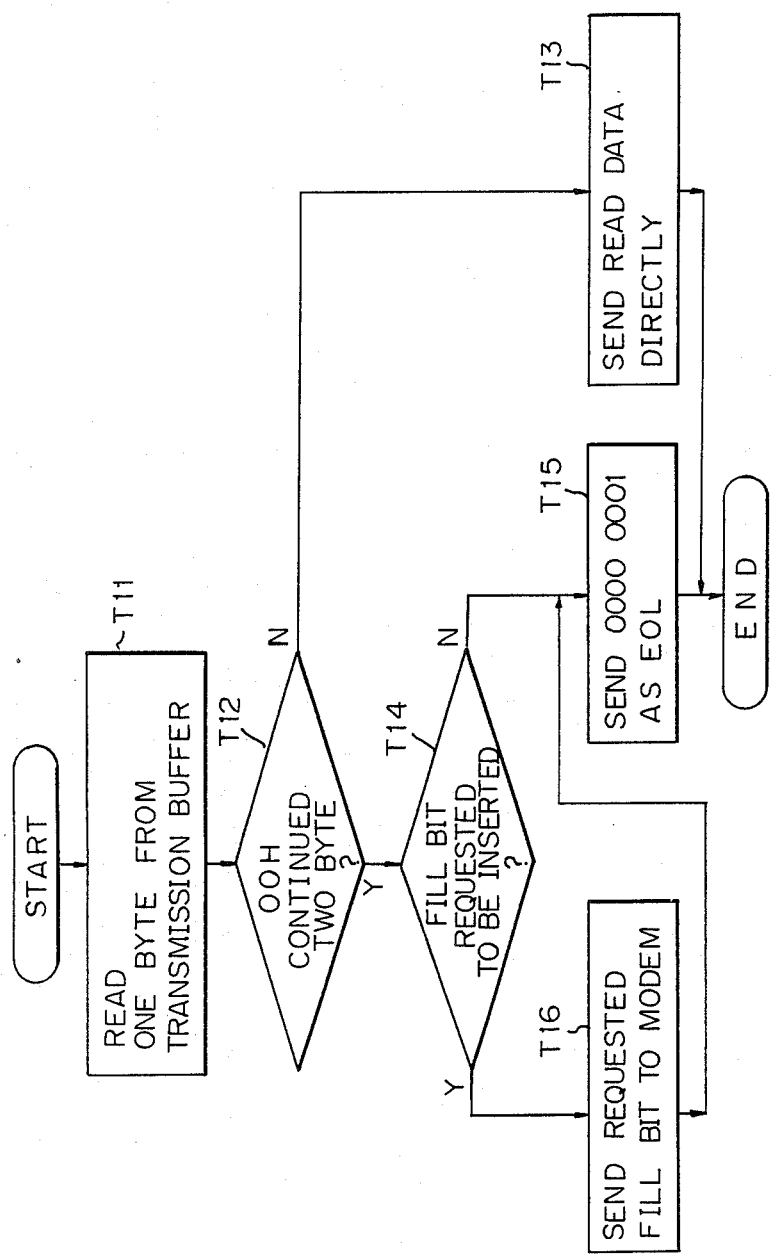

In the following, operations of the CPU 14 will be explained in reference to the control programs charted in FIGS. 6 to 8, wherein FIG. 6 shows a main routine for the signal transmitter to turn the live data to the MH encoded data and to send them to the signal transmission buffer; FIG. 7 shows a subroutine within the main routine of a portion where the arithmetic operation is carried out for the fill bit insertion; and FIG. 8 shows an interruption processing routine for transferring the data in the signal transmission buffer area within RAM 14-2 to the modem, at the signal transmission side.

First of all, explanations will be given as to the main routine shown in FIG. 6. In advance of the actual transmission of the image data, the minimum transmission time at the signal receiving side and the capacity of the signal receiving buffer memory are recognized at the transmitter side, and then these are stored in RAM 14-2. When the transmission of the image data commences, the total code length counter and the total minimum transmission time counter in RAM 14-2 are cleared to zero at step $S_{11}$, and the one-line code length counter in RAM 14-2 is cleared at step $S_{12}$. And, at step $S_{13}$, a run lenth RL is counted and then processing is effected such that the code is written into the transmission buffer, or a fill bit is inserted. Details of the step $S_{13}$ is shown in FIG. 7. The processing at the step $S_{13}$ is repeated until the termination of the encoding processing for one line is confirmed at step $S_{14}$. As soon as the encoding operation for one line is terminated, the operational sequence proceeds to step $S_{15}$. Thereafter, the code $00_H$ for forming the EOL signal is written in the transmission buffer area for two bytes. At step $S_{16}$, a code length of a line, on which the encoding has been completed, is added to the total code length counter. At step $S_{17}$, the minimum transmission time for one line is added to the total minimum transmission time counter. In this case, if the current line is totally white, $T_W$ is added, and if the line contains black image element, $T_B$ is added. The processings at the steps $S_{12}$ to $S_{17}$ are repeated until the termination of the image original reading is confirmed at step $S_{18}$. As soon as the image original has been read, RTC signal which means termination of an image signal is written in the transmission buffer.

In the following, explanations will be made as to the sub-routine shown in FIG. 7.

At step $S_{20}$, the run length RL is counted to determine its code, and the code length is added to the one-line code length counter at step $S_{21}$. Then, at step $S_{22}$, the code is sent into the transmission buffer area in RAM 14-2. At step $S_{23}$, the values in both total code length counter and the one-line code length counter are added, and determination is made as to whether the added value exceeds the capacity of the signal receiving buffer memory, or not. If the added value does not exceeds the capacity of the signal receiving buffer, the operational sequence returns to the main routine where the encoding is repeated. On the other hand, if the added value exceeds the capacity of the signal receiving buffer memory, the operational sequence proceeds to step $S_{24}$ where comparison is made between a value of the total code length counter of the lines preceding to the currently encoding line and a value of the total minimum transmission time counter. At step $S_{25}$ if the total code length value is larger, the operational sequence proceeds, as it is, to step $S_{27}$, because, in this case, no insertion of the fill bit is required. Also, when the total code length value is small, a flag is set at step $S_{26}$ to show that insertion of the fill bit in the preceding line is necessary. And, at step $S_{27}$, both total code length counter and total minimum transmission time counter are cleared to zero, and then the operational sequence returns again to the main routine.

As mentioned in the foregoing, if and when the capacity of the signal receiving buffer memory is exceeded on the way of encoding data in one line, determination is made to whether the fill bit is to be inserted into the data of the preceding lines. In other words, after transmission of the data for the maximum number of lines which can be perfectly stored in the buffer memory capacity of the signal receiver, such fill bit is inserted, if it becomes necessary to do so. That is to say, information on all lines as transmitted are, without exception, stored in the signal receiving buffer memory, and, only after the information have all been read out for recording, information on the subsequent lines are transmitted into the empty buffer. Accordingly, there is no possibility of a part of the information being lost by overflow of the buffer memory at the receiver side. It is also possible to remarkably shorten the transmission time.

In the following, explanations will be given as to the interruption processing routine shown in FIG. 8. When the interruption signal is generated from the timer circuit, codes for one byte are read out of the transmission buffer area in RAM 14-2 at the step $T_{11}$, and then determination is made, at step $T_{12}$ as to whether $00_H$ continues for two bytes, i.e., whether one line is terminated, or not. If one line is not terminated, the code read out at step $T_{13}$ is sent out to the modems, as it is. In the case of the one line termination, a flag showing further necessity for the fill bit is confirmed at step $T_{14}$. If no flag has been set, $00_H$ is converted to $01_H$ as EOL, and sent out to the modems. On the other hand, when the flag has been set, the fill bits for the subtracted values obtained at the step $S_{24}$ in FIG. 7 are sent out to modem at step $T_{16}$, after which EOL is sent out to the modems at step $T_{15}$. Incidentally, it should be noted that the fill bit is a continuous transmissiion of $00_H$. In the above-described manner, when the interruption processing is terminated, the operational sequence returns to the processing position in the main routine at the time instant when the interruption signal entered.

In the following, explanations will be made as to the processing program at the signal receiving side in reference to FIG. 9 which shows the interruption routine where CPU 21 hands over the received data from the modem to the signal receiving buffer area in RAM 21-2.

First of all, at step $R_1$, received data for one byte are taken in from the modem 18 through the serial/parallel converter 17. Then, at step $R_2$, determination is made as to whether $00_H$ has continued for three bytes or more, i.e., whether the received data contain the fill bit, or not. If $00_H$ continues for three bytes or more, the operational sequence proceeds to step $R_3$ where the fill bit is discarded. If $00_H$ is not continuous, the received data are written, at step $R_4$, into the receiving buffer area in RAM 21-2, as the effective data. The reason for discarding the fill bit at the step $R_3$ is that, if and when the fill bit is written is the receiving buffer area, there is likelihood of the receiving buffer memory causing overflow. For this reason, when $00_H$ continues for three bytes or more, no data is made entrable into the receiving buffer area until data containing therein a code "1" will come in.

As will be apparent from the foregoing description, the present invention adopts a system, wherein a signal transmitter which has recognized beforehand the buffer memory capacity at the signal receiving side does not usually insert any fill bit whatsoever to fill the minimum transmission time, but compares a time required for transmission of the data for the maximum number of lines to be completely received into the abovementioned buffer memory capacity and a time for recording operation which the signal receiver necessitates, and, only when the time required for the transmission is short, the fill bit for the difference is inserted, owing to which the transmission time can be shortened without increasing the recording speed of the signal receiver.

In the above-described embodiments according to the present invention, the minimum transmission time is differentiated between the line of total white and the line containing therein black image element. However, according to the recommendation of CCITT, the minimum transmission time for both lines is made same. Needless to say, the present invention is applicable even if the minimum transmission time is same for both lines.

While the present invention has so far been described with reference to a couple of preferred embodiments thereof, it should be understood that the invention is not limited to these embodiments alone, but any changes and modifications may be made by those persons skilled in the art within the ambit of the present invention as recited in the appended claims.

What I claimed is:

1. A method of facsimile transmission, wherein image signals as read from an image original at a signal transmission side are encoded, and the thus encoded data are transmitted to a signal receiving side, said method comprising steps of:
   (a) recognizing, at the signal transmission side, a minimum transmission time at a signal receiving side and a capacity of a buffer memory for temporarily storing therein received data;
   (b) detecting an amount of the encoded data corresponding to plural lines at every end of encoding of data of a line;
   (c) generating a fill bit when the detected amount of the encoded data exceeds a predetermined value;
   (d) storing the encoded data in a buffer memory at the signal transmission side; and
   (e) transmitting the encoded data stored in the buffer memory and the fill bit, the fill bit being added at an end of a line of the encoded data.

2. A method of facsimile transmission according to claim 1, wherein the signal receiving side does not store the fill bit in the buffer memory.

3. A facsimile method of facsimile transmission according to claim 1, wherein the minimum transmission time is differentiated between a case in which one line is totally white, and a case in which one line contains at least one black image element.

4. A method of facsimile transmission according to claim 1, wherein a quantity of the fill bit corresponds to a difference between a total sum of the minimum transmission time and a time required for a transmission of the encoded data corresponding to the amount of the encoded data.

5. A method of facsimile transmission according to claim 1, wherein the fill bit data is added upon transmission without storage in the buffer memory at the signal transmission side.

6. A method of facsimile transmission, wherein image signals as read from an image original at a signal transmission side are encoded, and the thus encoded data are transmitted to a signal receiving side, said method comprising steps of:
   (a) recognizing, at the signal transmission side, a capacity of a buffer memory to temporarily store therein received data at a signal receiving side;
   (b) detecting an amount of the encoded data corresponding to plural lines for each encoding of data of a line;
   (c) generating a fill bit when the amount of the encoded data has a predetermined relationship with a capacity of the buffer memory at the signal receiving side;
   (d) storing the encoded data excluding the fill bit in the buffer memory at the signal transmission side; and
   (e) transmitting the encoded data stored in the buffer memory at the signal transmission side and the fill bit data generated in said generating step, the fill bit being added at an end of a line of the encoded data.

7. A method of facsimile transmission according to claim 6, wherein the encoded data representing a number of lines less than the capacity of the buffer memory at the signal receiving side is continuously transmitted, a last one of the number of lines to be continuously transmitted being one line before the encoded data exceeds the capacity of the buffer memory.

8. A facsimile transmission apparatus, comprising:
   (a) reading means for reading an image original to obtain image signals;
   (b) encoding means for encoding the image signals;
   (c) modulating means for transmitting encoded data; and
   (d) output means for comparing an amount of the encoded data corresponding to plural lines with a capacity of a buffer memory in a signal receiving device, for each encoding of data of a line, and for continuously sending out to said modulating means encoded data representing a number of lines less than the capacity of the buffer memory at the signal receiving side.

9. A facsimile transmission apparatus according to claim 8, wherein, when the amount of the encoded data exceeds the capacity of the buffer memory at the signal receiving side, said output means adds a fill bit at the end of a last line of encoded data to send the encoded data with the fill bit to said modulating means, the last line being one line before the encoded data exceeds the capacity of the buffer memory.

10. A facsimile transmission apparatus, comprising:
(a) reading means for reading an image original to obtain image signals;
(b) encoding means for encoding the image signals;
(c) modulating means for transmitting encoded data;
(d) a buffer memory for temporarily storing the encoded data;
(e) detecting means for detecting an amount of encoded data corresponding to plural lines for each encoding of data of a line;
(f) generating means for generating a fill bit when the amount of encoded data exceeds a predetermined value; and
(g) sending means for sending the encoded data stored in said buffer memory and the fill bit generated by said generating means to said modulating means, the fill bit being added at an end of a line for the encoded data.

11. A facsimile transmission apparatus according to claim 10, wherein said generating means generates a quantity of the fill bit which corresponds to a difference between a total sum of a minimum transmission time and a time period required for transmission of the encoded data corresponding to the amount of the encoded data.

12. A facsimile transmission apparatus according to claim 11, wherein the minimum transmission time is differentiated between a case in which one line is totally white and a case in which one line contains at least one black image element.

13. A facsimile transmission apparatus according to claim 10, wherein said buffer memory is adapted to add the fill bit upon transmission without storage of the fill bit therein.

* * * * *

UNITED STATES PATENT AND TRADEMARK OFFICE
CERTIFICATE OF CORRECTION

PATENT NO. : 4,775,893
DATED : October 4, 1988
INVENTOR(S) : YUJI ISHIKAWA

Page 1 of 2

It is certified that error appears in the above-identified patent and that said Letters Patent is hereby corrected as shown below:

COLUMN 1

Line 13, "Haffman)" should read --Huffman)--.
Line 28, "fill bit" should read --fill bits--.

COLUMN 2

Line 18, "time" should read --times--.
Line 20, "$l_3;l_4<T_B$)." should read --$l_3,l_4<T_B$).--.
Line 43, "fo=($T_w$x1+$T_B$x3)-($l_1+l_2l_3+l_4$)." should read --fo=($T_w$x1+$T_B$x3)-($l_1+l_2+l_3+l_4$).--.

COLUMN 3

Line 21, "the result" should read --If the result--.
Line 26, "generator" should read --generator 4--.
Line 50, "invention" should read --invention,--.

COLUMN 4

Line 30, "zero," should read --is zero,--.

COLUMN 6

Line 67, "transmissiion" should read --transmission--.

COLUMN 8

Line 11, "facsimile" (first occurrence) should be deleted.

UNITED STATES PATENT AND TRADEMARK OFFICE
CERTIFICATE OF CORRECTION

PATENT NO. : 4,775,893
DATED : October 4, 1988
INVENTOR(S) : YUJI ISHIKAWA

It is certified that error appears in the above-identified patent and that said Letters Patent is hereby corrected as shown below:

COLUMN 10

Line 4, "for" should read --of--.

Signed and Sealed this

Twentieth Day of March, 1990

*Attest:*

JEFFREY M. SAMUELS

*Attesting Officer*  *Acting Commissioner of Patents and Trademarks*